United States Patent
Troudt

(10) Patent No.: US 6,378,922 B1
(45) Date of Patent: Apr. 30, 2002

(54) LENGTH-ADJUSTABLE EXTENSION POLE WITH SELF-ADJUSTING ACTUATING CABLE

(76) Inventor: Kevin J. Troudt, 6635 Devonshire Dr., Gladstone, OR (US) 97027

( * ) Notice: Subject to any disclaimer, the term of this patent is extended or adjusted under 35 U.S.C. 154(b) by 0 days.

(21) Appl. No.: 09/624,284

(22) Filed: Jul. 24, 2000

(51) Int. Cl.[7] ............................. A01B 1/02; B67D 5/64
(52) U.S. Cl. ..................... 294/19.1; 222/174; 239/532; 403/109.1
(58) Field of Search ........................... 294/19.1, 22, 23, 294/50.8; 15/144.3, 144.4; 16/429; 30/275.4, 296.1; 56/332, 333, 335; 222/174; 239/532; 403/109.1, 377

(56) References Cited

U.S. PATENT DOCUMENTS

| | | | |
|---|---|---|---|
| 379,359 A | * 3/1888 | Bosch | 222/174 X |
| 3,017,056 A | * 1/1962 | Bishop | 222/174 |
| 3,317,997 A | * 5/1967 | Hedstrom et al. | 294/19.1 X |
| 3,977,570 A | * 8/1976 | Smrt | 222/174 |
| 4,034,542 A | * 7/1977 | Loehr | 294/19.1 X |
| 4,886,191 A | * 12/1989 | Yoshitomi | 222/174 |
| 5,099,539 A | * 3/1992 | Forester | 294/19.1 X |
| 6,085,681 A | * 7/2000 | Morton | 294/19.1 X |

* cited by examiner

Primary Examiner—Johnny D. Cherry
(74) Attorney, Agent, or Firm—David L. Tingey

(57) ABSTRACT

A length-adjustable extension pole with telescoping members includes an accessory-actuating cable that automatically adapts its operative length in concert with length adjustment of the pole without separate action by a user. The cable runs within the telescoping members between a pole accessory end where an accessory is mounted and a pole handle end where a pole trigger lever is located. A first cable component, typically including a cable attached to a rack (or a notched or threaded rod), runs from the pole accessory end toward the pole handle end. A second cable component runs from the trigger lever on the pole handle end toward the pole accessory end overlapping the first cable component. A latch is pivotably mounted transversely in the handle end tubular member with the threaded rod passing through a hole in the latch and the second cable component connected to the latch distal end such that when the trigger lever is pulled, the latch pivots into engagement with the first cable component, establishing the cable operative length. Further movement of the trigger lever continues to pull the second cable component, which then also pulls the second component connected to the accessory. When the trigger lever is released, the grasping mechanism likewise releases from the first component allowing it to slide freely within the latch hole.

16 Claims, 4 Drawing Sheets

LENGTH-ADJUSTABLE EXTENSION POLE WITH SELF-ADJUSTING ACTUATING CABLE

BACKGROUND

1. Field of the Invention

This invention relates generally to extension poles with a cable connected between a pole handle end and an opposite pole accessory end to actuate an accessory by action of a trigger lever on the handle end and, more specifically, to such extension poles adjustable in length.

2. Prior Art

It has long been recognized that extending a user's reach through an extension pole is advantageous. A paint roller mounted on a pole allows one to work beyond one's natural reach. A pruner on an extension pole allows one to access tree tops otherwise difficult to reach. Painters mount a spray gun on an extension pole also to work beyond one's natural reach. For accessories such as pruners and fluid sprayers that require an actuating movement, that is, to pull the trigger of the gun, a cable or the like is connected between the pole accessory end and the pole handle end. Movement of a trigger on the handle end is then communicated to the trigger on the spray gun.

Just as it is advantageous to extend one's reach with an extension pole, it is also advantageous to have available a pole of a preferred length suitable to an application or to changing requirements of an application. Thus, rather than have a number of poles of various lengths requiring the remounting of the accessory between poles, it would be advantageous to have a pole adjustable in length. However, the difficulty introduced is maintaining the operation of the cable between the pole handle end and the pole accessory end to actuate the accessory with action of the pole trigger.

Clearly, one solution is to simply run the cable between a fixed attachment on the pole accessory end and a releasable attachment on the handle end. In which case, a user releases the attachment, such as unscrewing a butterfly screw or similar attachment, adjusting the pole length, perhaps between telescoping members, and reattaching the cable pulled taut along the pole. Though functional, this requires a length-sensitive adjustment of the actuating cable that correctly positions the accessory, such as a fluid spray trigger, with the pole trigger. A misadjustment, which would tend to be common, would reduce the operational effect of the cable between the handle trigger and the accessory trigger. It would also be a time-demanding bother that would make the pole length adjustment less advantageous to a workman with a premium on his time. A better solution would be to have an extension pole with an adjustment mechanism internal the pole that automatically achieves an operative adjustment of the cable as the pole is adjusted in length, quick and transparent to the user, requiring no additional movement beyond the length adjustment of the pole.

SUMMARY

The primary object of the present invention then is to provide an extension pole having an accessory-actuating cable with a length adjustment that automatically adapts the operative length of the cable in concert with the adjustment in length of the pole without separate action by a user. This object is achieved in a pole with telescoping tubular members for pole length adjustment and a cable running between a pole accessory end where an accessory such as a sprayer or a pruner is mounted and a pole handle end where a pole trigger lever is located. When the cable is connected between the trigger lever and the accessory, movement of the trigger is communicated to the accessory through the cable to actuate the accessory.

The cable within the telescoping members comprises two length components, a first cable component running from the pole accessory end toward the pole handle end and a second cable component running from the trigger lever on the pole handle end toward the pole accessory end and overlapping the first cable component. A grasping mechanism is secured in the handle end tubular member with the second cable component connected between the trigger lever and the grasping mechanism such that when the trigger lever is pulled, the grasping mechanism securely engages the first cable component, establishing the cable operative length. Further movement of the trigger lever continues to pull the second component, which then also pulls the second component connected to the accessory. When the trigger lever is released, the grasping mechanism likewise releases from the first component allowing it to slide freely within the grasping mechanism. Thus, when the trigger lever is not pulled, the pole tubular members and cable are free to adjust to any preferred length, movement of the accessory end telescoping relative to the handle end tubular member also moving the first cable component through the grasping mechanism in the handle end tubular member automatically adjusting the operative length of the cable. The two tubular members are then releasably locked together at a preferred length.

Typically, the first cable component comprises a rod with a surface matching the grasping mechanism that enhances a secure engagement of the grasping mechanism with the rod, such as a rack or a notched or threaded rod passing through the grasping mechanism. A more flexible cable typically extends from a rod end out of the accessory end tubular member to an accessory mounted on the pole. The second cable component typically comprises any form of operative line connected between the grasping member and the trigger lever.

The grasping member comprises a latch pivotably mounted transversely in the first tubular member with a hole through which the threaded rod passes. The second cable component is connected to a latch end opposite its pivoting end such that the trigger lever movement pivots the latch. As the latch rotates, it contacts the threaded rod passing through its hole. The hole includes upper and lower beveled surfaces with a plurality of teeth matching the threads of the threaded rod. The beveled surfaces are angled such that when the latch is rotated by the second cable component, they are parallel with the threaded rod, and the teeth engage the threads of the threaded rod, effectively grasping the threaded rod.

DETAILED DESCRIPTION OF THE PREFERRED EMBODIMENT

Figure 1:
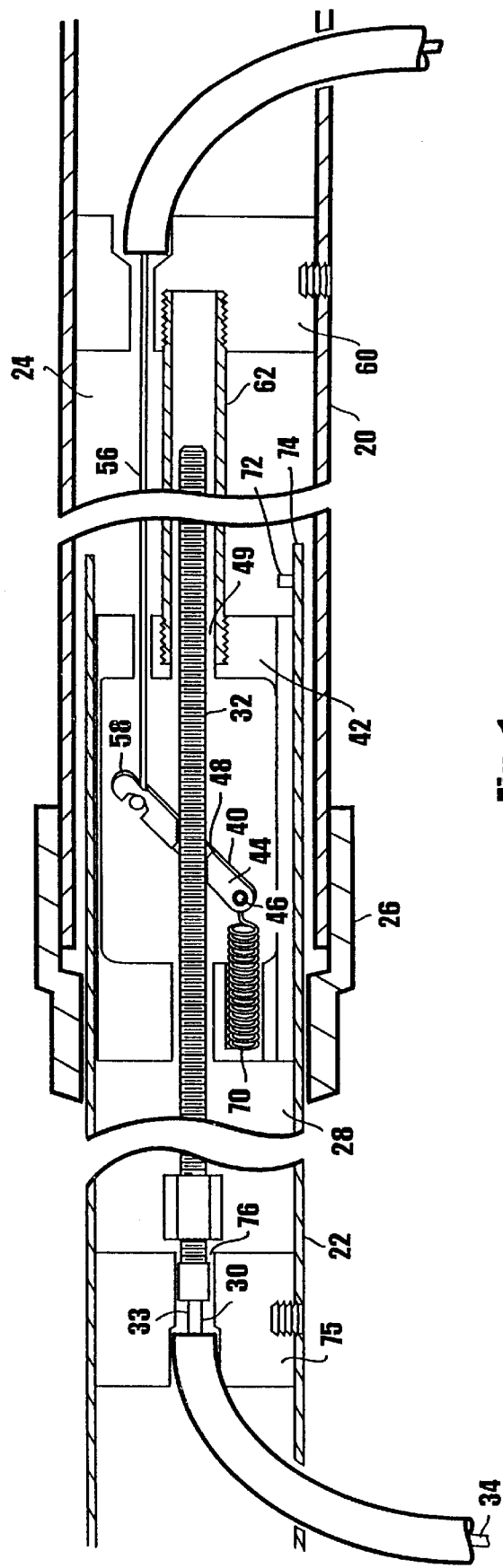
FIG. 1 is a side cross-sectional view of the length-adjustable extension pole with actuating cable showing the cable and a latch internal to two telescoping tubular pole members.
Figure 2:
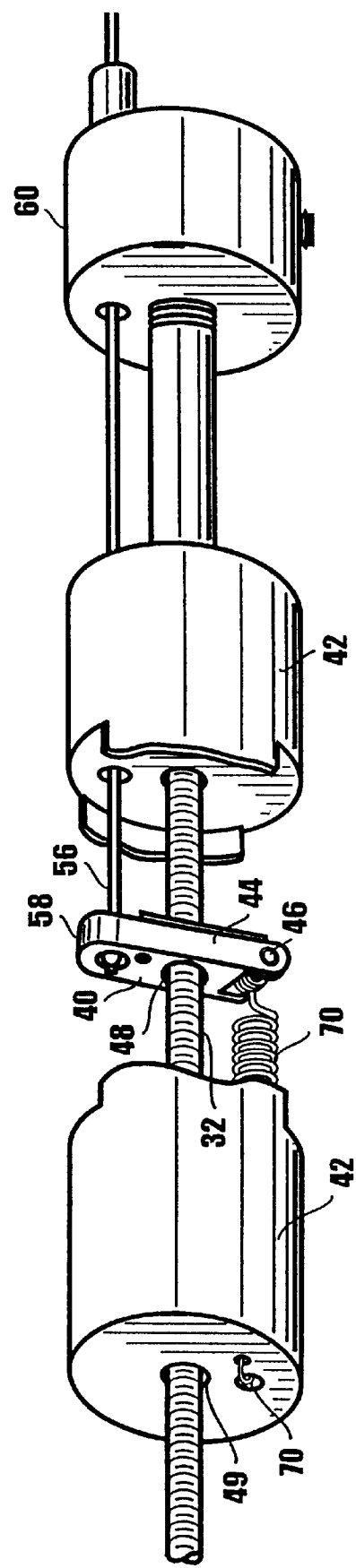
FIG. 2 is a perspective cut-away view of the cable and latch.
Figure 4:
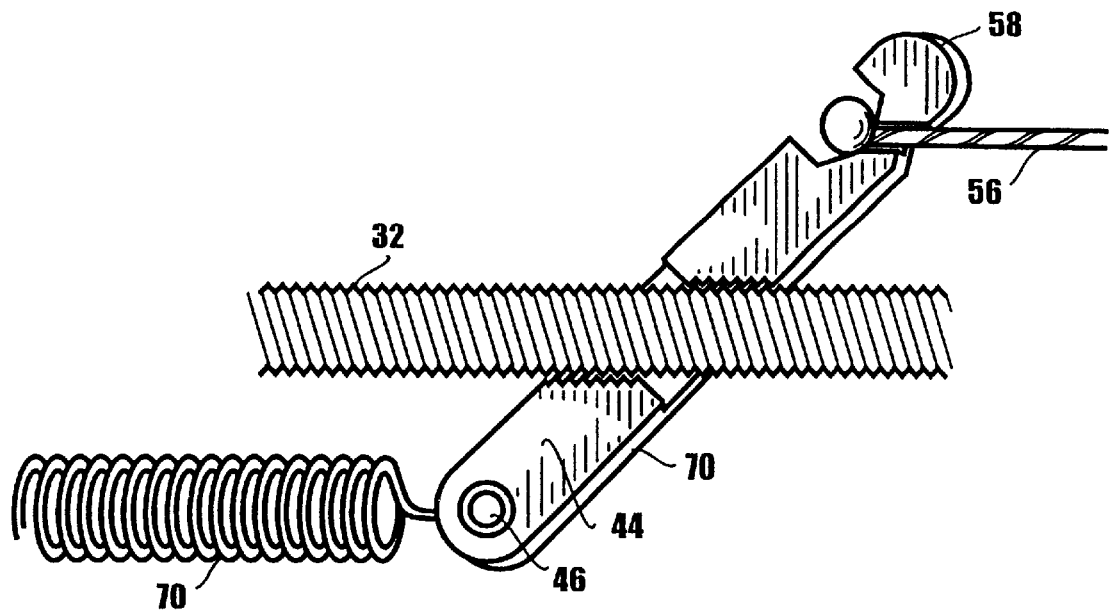
FIG. 4 is a perspective view of the latch of FIG. 3 shown in engaging position with teeth on beveled surfaces parallel with and engaging the threaded rod.
Figure 3:
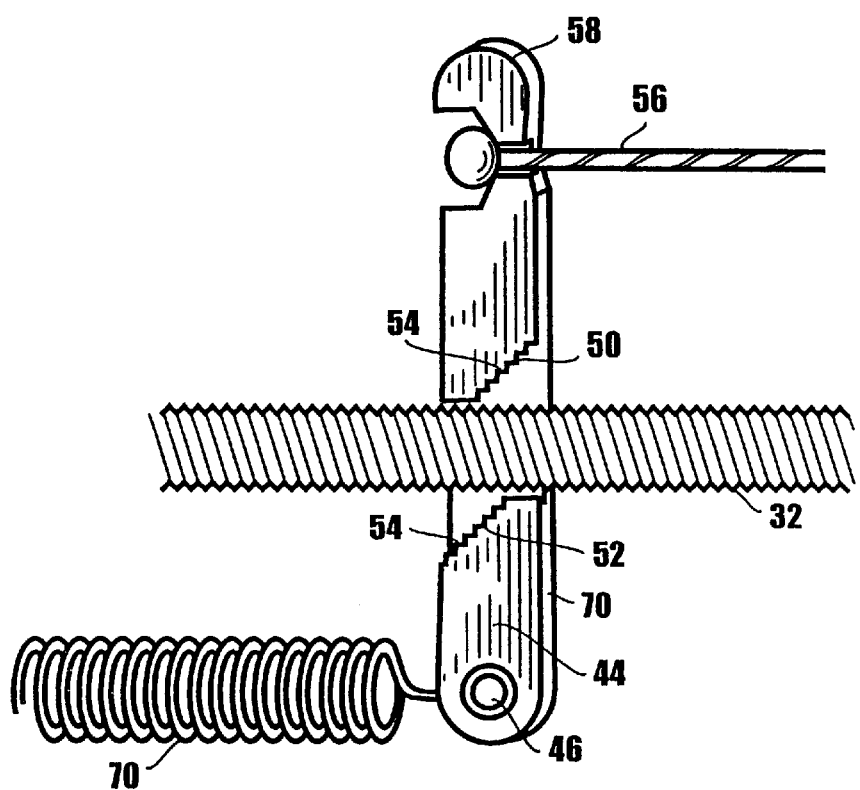
FIG. 3 is a perspective view of the latch shown in nonengaging position with a threaded rod passing freely through a latch hole. A biasing spring is also shown attached at the latch pivoting end for returning the latch to its nonengaging position when the pole trigger lever is released. A cable that runs to the trigger lever is shown attached at the latch distal end.
Figure 6:
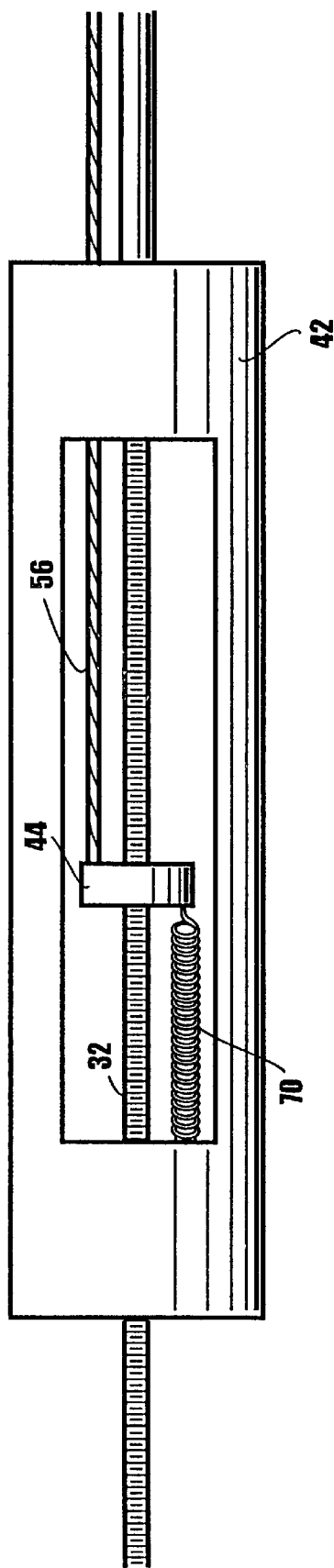
FIG. 6 is a top view of the latch.
Figure 5:
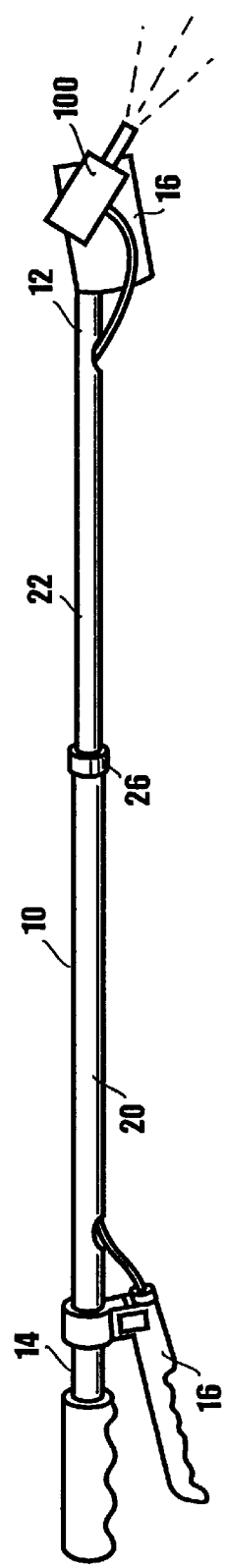
FIG. 5 shows a perspective view of the pole with a spray gun accessory mounted on its pole accessory end and a trigger to which the cable from the latch is connected at the pole handle end.

The length-adjustable extension pole 10 with an accessory end 12 and a handle end 14 includes a mount on its accessory end for mounting an accessory 100 and a cable 30 as an accessory actuator for actuating the accessory remotely. A trigger lever 16 is also provided on the pole handle end. A first tubular member 20 with a first passageway 24 longitudinal therethrough receives a second tubular member 22 with a second passageway 28 telescoping from the first tubular member 20, secured at a preferred location relative to the second tubular member by a locking mechanism 26 such as a locking collar. The cable 30, or a threaded rod 32 connected to one end 33 of the cable 30, passes slidably through the second passageway 28 with the cable other end 34 passing slidably out of the second tubular member 22 for attachment to a pole accessory that may be mounted to the pole at its accessory end. It should be understood that for purposes of describing this invention, the term "threaded rod" is deemed to include a rack or a notched or threaded rod or similar rod with a surface that enhances a secure engagement of a grasping mechanism 40 with the rod. The cable with threaded rod is of length sufficient to remain within the passageway at all operational positions of the second tubular member as it telescopes from the first telescoping member in adjusting an operational pole length.

The grasping mechanism comprises a latch housing 42 in the first tubular member that has a latch 44 pivotably mounted transverse to the tubular member on a pivot pin 46. The cable, or the threaded rod on the end of the cable, passes through a hole 48 in the latch. As the latch is pivoted on the pivot pin, it moves into contact with the cable or threaded rod. Typically, the hole is bounded at least in part by upper and lower beveled surfaces 50, and 52 with a plurality of teeth 54 that match the threaded rod for releasably engaging the threads or teeth of the rod. The upper and lower beveled surfaces are angled such that they are parallel with the cable when the latch member is pivoted into engagement with the cable.

A line 56 runs between the trigger lever and the latch, connected to the latch at its distal end 58, such that when the lever is in an inactive position, the latch does not engage the cable or threaded rod but allows the cable to slide freely within the passageway, but when the lever is moved to an active position, the line pulls the latch into engagement with the cable.

A suspension tube anchor plug 60 is also secured within the first tubular member. With the second telescoping member passing between the latch housing and the first telescoping member, a suspension tube 62 connects between the suspension tube anchor plug 60 and the latch housing 42 anchoring the latch housing to the first tubular member 20, the suspension tube fitting over an opening 49 in the latch housing through which the cable or threaded rod passes to extend the opening 49 beyond the latch housing 42 to the suspension tube anchor plug 60 to support the cable or threaded rod extending beyond the latch housing.

A spring 70 connected between the latch housing 42 and the latch member 44 biases the latch member normal to the threaded rod 32 and resists pull of the trigger lever 16.

A stop pin 72 extends radially inward from the second tubular member between its end 74 and the latch housing 42 such that the stop pin impacts the latch housing upon full telescopic extension of the pole, preventing removal of the second tubular member from the first tubular member.

A support plug 74 is secured within the second tubular member and has a support plug hole 75 through which the said cable passes slidably for support as the cable passes out of the second tubular member for attachment to said pole accessory.

Having described the invention, what is claimed is as follows:

1. An adjustable extender pole with an accessory end and a handle end and including a means for mounting an accessory on its accessory end and an accessory actuator with a lever at its handle end which actuates that accessory, the improvement comprising, a first tubular member with a passageway longitudinal therethrough, a second tubular member telescoping from the first tubular member, means to secure the first tubular member at a preferred telescoping location relative to the second tubular member, a cable slidably passing through the passageway on its first end and its second end passing slidably out of the second tubular member for attachment to a pole accessory that may be mounted to the pole at its accessory end, the cable of length sufficient to remain within the passageway at all operational positions of the second tubular member as it telescopes from the first tubular member in adjusting an operational pole length, engaging means secured in the first tubular member for releasably engaging the cable, actuating means for actuating the engaging means to engage the cable, the actuating means providing a link between the engaging means and the lever such that when the lever is in an inactive position, the engaging means does not engage the cable but allows the cable to slide freely within the passageway but when the lever is moved to an active position, the engaging means engages the cable as a result of the actuating means actuating the engaging means, the engaging means pulling the cable in concert with movement of the lever.

2. The adjustable extender pole of claim 1 further comprising a latch housing secured within the first telescoping member with an opening passing therethrough, said engaging means attached to the latch housing, the second tubular member passing between the latch housing and the first tubular member.

3. The adjustable extender pole of claim 2 in which the engaging means further comprises a pivot pin mounted transversely in the latch housing, a latch member with first and second ends and a latch member cable hole therebetween longitudinal with the first tubular member through which the cable passes and a pivot pin hole at the latch member first end transverse to the cable hole through which the pivot pin passes in mounting the latch member pivotably to the latch housing, the actuating means connected to the latch member at the latch member second end, a first spring connected between the latch housing and the latch member biasing the latch member normal to the cable such that the cable can slide through the cable hole unhindered in said inactive position, and when the latch member is pulled by the actuating means at its second end, it pivots on the pivot pin into engagement with the cable passing through the latch member hole, grasping and pulling the cable in concert with the actuating means.

4. The adjustable extender pole of claim 3 wherein the latch member cable hole includes upper and lower beveled surfaces that are parallel with the cable when the latch member is pivoted into engagement with the cable.

5. The adjustable extender pole of claim 4 wherein the cable comprises a regularly-notched surface portion passing through the latch member cable hole.

6. The adjustable extender pole of claim 5 wherein the latch member cable hole beveled surfaces comprise a plurality of teeth matching the cable regularly-notched surface portion for releasable engagement of the teeth in the regularly-notched surface.

7. The adjustable extender pole of claim 2 further comprising a suspension tube anchor plug secured to the first tubular member, a suspension tube connected between the suspension tube anchor plug and the latch housing anchoring the latch housing to the first tubular member, the tube fitting over the opening to extend the opening beyond the latch housing to the suspension tube anchor plug to support the cable extending beyond the latch housing.

8. The adjustable extender pole of claim 2 further comprising a stop pin extending radially inward from the second tubular member between its end and the latch housing such that the stop pin impacts the latch housing upon fall telescopic extension of the pole, preventing removal of the second tubular member from the first tubular member.

9. The adjustable extender pole of claim 1 wherein the actuating means comprises a line connected between the engaging means and the lever.

10. The adjustable extender pole of claim 1 further comprising a support plug with a support plug hole secured within the second tubular member, said cable passing slidably supported through the support plug hole and out of the second tubular member for attachment to said pole accessory.

11. An adjustable extender pole with an accessory end and a handle end and including a means for mounting an accessory on its accessory end and an accessory actuator with a lever at its handle end which actuates that accessory, the improvement comprising, a first tubular member with a passageway longitudinal therethrough, a second tubular member telescoping from the first tubular member, means to secure the first tubular member at a preferred telescoping location relative to the second tubular member, a cable slidably passing through the passageway on its first end and its second end passing slidably out of the second tubular member for attachment to a pole accessory that may be mounted to the pole at its accessory end, the cable of length sufficient to remain within the passageway at all operational positions of the second tubular member as it telescopes from the first tubular member in adjusting an operational pole length, actuating means for actuating the engaging means to engage the cable, the actuating means providing a link between an engaging means and the lever such that when the lever is in an inactive position, the engaging means does not engage the cable but allows the cable to slide freely within the passageway but when the lever is moved to an active position, the engaging means engages the cable as a result of the actuating means actuating the engaging means, the engaging means pulling the cable in concert with movement of the lever, a latch housing secured within the first tubular member with an opening passing therethrough, said engaging means attached to the latch housing, the second tubular member passing between the latch housing and the first tubular member, said engaging means secured in the first tubular member for releasably engaging the cable, comprising a pivot pin mounted transversely in the latch housing, a latch member with first and second ends and a latch member cable hole therebetween longitudinal with the first tubular member through which the cable passes and a pivot pin hole at the latch member first end transverse to the cable hole through which the pivot pin passes in mounting the latch member pivotably to the latch housing, the actuating means cohected to the latch member at the latch member second end, wherein the latch member cable hole includes upper and lower beveled surfaces that are parallel with the cable when the latch member is pivoted into engagement with the cable, a first spring connected between the latch housing and the latch member biasing the latch member normal to the cable such that the cable can slide through the cable hole unhindered in said inactive position, and when the latch member is pulled by the actuating means at its second end, it pivots on the pivot pin into engagement with the cable passing through the latch member hole, grasping and pulling the cable in concert with the actuating means.

12. The adjustable extender pole of claim 11 wherein the cable comprises a regularly-notched surface passing through the latch member cable hole and wherein the latch member cable hole beveled surfaces comprise a plurality of teeth matching the cable regularly-notched surface portion for releasable engagement of the teeth in the regularly-notched surface.

13. The adjustable extender pole of claim 11 further comprising a suspension tube anchor plug secured to the first telescoping member, a suspension tube connected between the suspension tube anchor plug and the latch housing anchoring the latch housing to the first telescoping member, the tube fitting over the opening to extend the opening beyond the latch housing to the suspension tube anchor plug to support the cable extending beyond the latch housing.

14. The adjustable extender pole of claim 11 wherein the actuating means comprises a line connected between the latch second end and the lever and passing through a latch housing actuator hole.

15. An adjustable extender pole with an accessory end and a handle end and including a means for mounting an accessory on its accessory end and an accessory actuator with a lever at its handle end which actuates that accessory, the improvement comprising, a first member with a passageway therethrough, a second member telescoping from the first member, means to secure the first member at a preferred telescoping location relative to the second member, a line with a first end attached to the lever, a cable slidably passing through the passageway on its first end overlapping the line with its second end passing slidably out of the second member for attachment to a pole accessory that may be mounted to the pole at its accessory end, the cable of length sufficient to remain within the passageway and overlapping the line at all operational positions of the second member as it telescopes from the first member in adjusting an operational pole length, engaging means secured to the first member and attached to the line at its second end opposite the first end for releasably engaging the cable by movement of the lever, such that when the lever is in an inactive position, the engaging means does not engage the cable but allows the cable to slide freely within the passageway but when the lever is moved to an active position, the engaging means engages the cable, the engaging means pulling the cable in concert with movement of the lever, the operative cable length thereby self-adjusting only by length adjustment of the pole simultaneous with telescoping movement of the first and second members.

16. An adjustable extender pole with an accessory end and a handle end and including a means for mounting an accessory on its accessory end and an accessory actuator with a lever at its handle end which actuates that accessory, the improvement comprising, a first tubular member with a passageway longitudinal therethrough, a second tubular member telescoping from the first tubular member, means to secure the first tubular member at a preferred telescoping location relative to the second tubular member, a cable slidably passing through the passageway on its first end and its second end passing slidably out of the second tubular member for attachment to a pole accessory that may be mounted to the pole at its accessory end, the cable of length sufficient to remain within the passageway at all operational positions of the second tubular member as it telescopes from the first tubular member in adjusting an operational pole length, engaging means secured in the first tubular member for releasably engaging the cable, actuating means for actuating the engaging means to engage the cable, the actuating means providing a link between the engaging means and the lever such that when the lever is in an inactive position, the engaging means does not engage the cable but allows the cable to slide freely within the passageway but when the lever is moved to an active position, the engaging means engages the cable as a result of the actuating means actuating the engaging means, the engaging means pulling the cable in concert with movement of the lever.

* * * * *